United States Patent
Waldmann

(10) Patent No.: US 6,716,366 B2
(45) Date of Patent: Apr. 6, 2004

(54) CHEMICAL COMPOSITION FOR TREATMENT OF NITRATE AND ODORS FROM WATER STREAMS AND PROCESS WASTEWATER TREATMENT

(75) Inventor: John J. Waldmann, Charlotte, NC (US)

(73) Assignee: Maxichem Inc., Charlotte, NC (US)

( * ) Notice: Subject to any disclaimer, the term of this patent is extended or adjusted under 35 U.S.C. 154(b) by 47 days.

(21) Appl. No.: 09/904,547

(22) Filed: Jul. 16, 2001

(65) Prior Publication Data

US 2002/0011447 A1 Jan. 31, 2002

Related U.S. Application Data

(63) Continuation-in-part of application No. 09/408,834, filed on Sep. 30, 1999, now Pat. No. 6,261,459.

(51) Int. Cl.$^7$ ................ C02F 5/12; C02F 5/08; A61L 9/012; A61L 9/014; B01J 20/24
(52) U.S. Cl. ............ 252/181; 210/903; 210/925; 252/179; 422/37; 502/404; 502/413
(58) Field of Search ............... 252/181, 179; 210/903, 925; 502/404, 413; 514/241; 422/37; 516/100; 106/166.82

(56) References Cited

U.S. PATENT DOCUMENTS

| | | | | |
|---|---|---|---|---|
| 2,785,136 A | * | 3/1957 | Colarusso | 252/181 X |
| 2,819,173 A | * | 1/1958 | Dithmar | |
| 2,825,655 A | * | 3/1958 | Meadows | |
| 3,883,438 A | * | 5/1975 | Remer | |
| 3,980,556 A | * | 9/1976 | Besik | 210/903 X |
| 4,677,086 A | * | 6/1987 | McCue et al. | 502/413 X |
| 4,772,307 A | * | 9/1988 | Kiss et al. | 210/903 X |
| 5,071,587 A | * | 12/1991 | Perman | 252/181 |
| 5,488,021 A | * | 1/1996 | DeLiso et al. | 502/413 X |
| 5,681,475 A | * | 10/1997 | Lamensdorf et al. | 252/181 X |
| 5,801,116 A | * | 9/1998 | Cottrell et al. | 502/404 |
| 6,261,459 B1 | * | 7/2001 | Waldmann | 210/666 |
| 6,426,317 B1 | * | 7/2002 | Garris et al. | 514/241 X |

* cited by examiner

*Primary Examiner*—Richard D. Lovering
(74) *Attorney, Agent, or Firm*—Isaac A. Angres

(57) ABSTRACT

Novel compositions are described for use in nitrate removal and treatment of water such as water and wastewater streams produced by processes in mining operations, agriculture industries operations, industrial operations, military operations, etc. These novel compositions are also useful for the treatment of water and wastewater streams associated with the running of industries and with the production and maintenance of livestock. Advantages of these novel compositions include use of them without need for pH adjustment and/or the presence of electropositive metals, inorganic acid, or alkaline compounds. One embodiment of these novel compositions comprises: (1) a sufficient amount of organic modified clay, (2) a highly crosslinked carbohydrate polymer with branched-chain structure containing sulfide and/or disulfide groups, or an alloy or blend of such a polymer with triazine-trithione sodium salt, (3) high swelling sodium bentonite or calcium bentonite, and (4) activated carbon.

8 Claims, No Drawings

CHEMICAL COMPOSITION FOR TREATMENT OF NITRATE AND ODORS FROM WATER STREAMS AND PROCESS WASTEWATER TREATMENT

This application is a continuation-in-part of U.S. Ser. No. 09/408,834 filed Sep. 30, 1999, now U.S. Pat. No. 6,261,459.

BACKGROUND OF THE INVENTION

1. Field of the Invention

The present invention relates to the removal of nitrates and ammonia from process water, wastewater streams, livestock wastewater, lagoon water systems, suspended solids sludge, and the like resulting, for example, from processes in mining operations, agriculture facilities operations, and military facilities operations. Of particular interest is the removal of nitrates and ammonia from lagoon water having nitrate and metal ions, such as seen in mining operations. The process to remove nitrates includes the addition of absorbent or absorbent-adsorbent products in a solid form or pellets to the water stream without pH adjustment. The process is without ions containing electropositive metals like aluminum, copper, zinc, or iron alone or in combination with other metals in ions. The removal of these ions from the process eliminates the need to have chlorine or sulfur based acids as well alkali present.

Processing of the water or wastewater stream is done by passage through a canister or tower system having several layers of coagulant-absorbend-adsorbent. The absorbent compositions are based on products consisting of:

(1) a material selected from the group consisting of an organically modified sodium and/or calcium bentonite, siliceous vulco clay (volclay), attapulgite clay, a hydrous silicate of aluminum generated from sodium bentonite or calcium bentonite, cross-linked montmorillonite molecular sieves, porous silicate glass, kaolin surface modified by polycyclopentadient, tricalcium aluminate, calcium silicate hydrate (comprising by formula $Ca_6Si_6O_{17}(OH)_2$) with bulk density of 85–139 g/liter, silica xerogels, high-porosity silica xerogels, materials with a cystalline metal-organic microporous surface, surface altered zeolites, clinoptilolite, and zeolite Analcime (Analcite comprising by formula $Na_2O.Al_2O_3.4SiO_2.2H_2O$);

(2) with a compound selected from the group consisting of an insoluble carbohydrate polymer 24% amylose and 75% amilopectin; a branched-chain structure having sulfide, disulfide sulfonated or sulfate group(s) present; crosslinked starch xanthate; starch xanthate-xanthide mixture (preferably crosslinked by 2-chloro-N,N-diethylacetamide, epichlorohydrin, sodium trimetaphosphate, phosphorous oxychloride, formaldehyde, glyoxal, acrolein, N-methylol urea, or other efficient agents that can give a degree of substitution of from 0.12 to 0.98); dithiocarbonic acid and xanthate; amd (3) a compound selected from the group of
   (a) a sulfur containing compound selected from the group consisting of 3-mercaptopropyltrimethoxysilane, 3-mercaptopropylmethyldimethoxysilane, and 1,3,5-Triazine-2,4,6-(1H,3H,5H)-trithione, trisodium salt, or
   (b) regenerated cellulose (Ground Viscose) modified by NaOH-Diethylaminoethyl chloride hydrochloride crosslinked with EPI(epichlorohydrin) and having an exchange capacity of 0.65–0.95 milliequivalents per gram or
   (c) a carbon containing compound selected from activated carbon, anthracite and lignin.

High levels of nitrate in ground water can create a serious health risk. The nitrate outflow onto shallow continental shelves can produce nearshore algae blooms. Techniques such as selective ion exchange, reverse osmosis, distillation, and electrodialysis are limited to the transfer of nitrate between two bodies of water. Only biological processes are presently available for nitrate destruction. These processes are very limited in use due in part to adverse effects of non-constant water temperature as well as the high cost of use in the field.

In the United States and Europe, legislation now specifies a maximum permissible nitrate level in water for drinking or industrial use. Maximum legal nitrate levels in drinking water are 44 mg/liter in United States and 50 mg/liter in Europe. In the United States the nitrate removal is strongly regulated by the EPA in its efforts to reduce this serious threat to the water supply.

The water odor treatment contemplated by this invention is particularly applicable to wastes derived from slaughterhouses, fancy meat departments, and tank houses. The instant method is particularly applicable for reducing odors and contaminants from multi-animal wastewater sources. Current government regulations require that such waste contaminants must be removed from the wastewater, or collected in storage so as to be in compliance with the regulations. The Environmental Protection Agency (EPA) has recently issued very stringent effluent guidelines and standards for hog and poultry industries in particular.

The food processing industries such as the hog industry, poultry industry, slaughter-houses, fish meal factories and bone meal factories typically consume large quantities of water in the various processing segments of their plants, which water is then discharged as wastewater. This water and/or wastewater, contains large quantities of fats and oils, fatty acids, proteineceous material, blood, and other undesirable solids.

The resultant generally foul smelling wastewater has over 1,000 parts per million (ppm) of total ammonia, over 1,000 ppm of total nitrogen, over 100,000 mg./l. Biological Oxygen Demand (BOD), over 200,000 ppm Chemical Oxygen Demand (COD), over 50,000 ppm of Total Suspended Solids (TSS), and over 30,000 ppm of Oil and Grease (O&G). These levels may vary from plant to plant.

Even higher nitrate and metals concentrations are produced in (waste)water streams or lagoons by processes in the mining industry, industrial military operations, and other agricultural industry.

2. Description of the Prior Art

The patent literature suggests different systems for nitrate removal. For example in U.S. Publication No. H1,126, Pan et al. disclose a process comprised of
   1—adding Sulfamic acid to the wastewater, in stoichiometric proportion with respect to sodium nitrate and under strict pH control, and
   2—settling with filtration to form gaseous nitrogen.

Use of such as system is limited to only a small scale, and can not be used to treat large scale or volume of water such as from mining and agriculture operations or in lagoons which contain millions of gallons of water. This chemical process is totally impractical for treatment of large volumes of water given its complexity that includes the difficulties associated with the large sludge volume generated, strict pH control, precipitation, settling and filtration.

In U.S. Pat. No. 5,069,800, Murphy, discloses a chemical process for the denitrification of water by treating water with a metal sufficiently electropositive to decompose the water contamination while regulating the pH to be in very narrow range, (8–11.5). This adjustment is to a crucial nitrate reduction range (especially above 9.1–9.3 up to 11.5) needed for most efficient reduction of nitrate ion. At pH 6.5 to 8, the water in these processes is not sufficiently alkaline in order to start to dissolve the metal, for instance aluminum particles, and little or no reaction occurs. These processes described are neither economical nor efficient for the treatment of large volumes of water for nitrate removal, and can generate very easily new sources of metal cation pollutants in the water stream. The '126 and '800 patents are incorporated herein by reference.

In addition, the patent literature reveals that a number of systems have been proposed for clarification of industrial waste effluent from various types of animal waste as described in Waldmann's U.S. Pat. No. 6,261,459 and incorporated in its entirety by reference.

One aspect of the invention is that the organophilic clays employed include (among others) primary, secondary, tertiary, and quaternary substituted ammonium salts of montmorillonite, hectorite, attapulgite, sepiolite, and semecite in which the substituted ammonium cation or phosphonium cation contains at least one carbon chain of 12 or more carbon atoms in length. These organically modified clays are used in general as thickener agents. The chemically modified clay of the present invention is described in Waldmann's U.S. Pat. No. 6,261,459 and commercially available. Preferred are the powder forms with smaller particles having low density (Specific Gravity), preferably (1) or less.

None of these aforementioned references teach or suggest the use of product compositions having organoclay to remove nitrate or high concentrations of nitrate-heavy metals present. In contrast, the organoclay compositions of the present invention are described in '459 as acting as absorbents and adsorbents.

These above listed patents and U.S. Pat. No. 6,261,459 are incorporated herein by reference.

Cox, et. Al., in U.S. Pat. Nos. 5,609,863 and 5,807,587 disclose compositions and methods for reducing odor and septicity by use of one or more aldehydes and/or one or more ketones along with other compounds. '587 also discloses the use of a sulfur and oxygen-bearing component selected from the group of sulfites, metabisulfites, lithium hydrosulfite, and the like. Neither '863 nor '587 teach or suggest that the methods described eliminate the water contaminants e.g. remove nitrate or nitrate-heavy metals mixtures. The disclosures of '869 and '587 are incorporated herein by reference.

SUMMARY AND OBJECT OF THE INVENTION

The present invention is a CIP of Serial No. 09/408,834, now U.S. Pat. No. 6,261,459. The present invention discloses a chemical composition and method for treating nitrate containing water or wastewater streams to reduce and remove nitrates and nitrate-heavy metals mixtures. More particularly, this invention relates to the use of a combination of:

(1) a clay with the highly synergetic effect from double quaternary ammonium compounds or from mono- or di-ammonium salts of chloride, sulfate, carboxylate, bicarbonate, or phosphonium salts; or mixtures of these compounds or salts with calcium bentonite, sodium bentonite, siliceous volclay, attapulgite clay, hydrous silicate of aluminum or magnesium, surface altered zeolites or clinoptilolite, zeolite Amalcine (Analcite), crystalline metal-organic microporous materials, cross-linked montmorillonite molecular sieves, porous silicate glass, silicate xerogels, high-porosity silica xerogels, or calcium silicate hydrate (known as Promoxon) in combination with (2) insoluble carbohydrate polymer consisting 25% amylose and 75% amilopectin with a branched-chain structure and having sulfide, disulfide, sulfonated or sulfate groups present; xanthate; crosslinked starch xanthate; or starch xanthate-xanthide mixtures (crosslinked preferably by 2-chloro-N,N-diethylacetamide, epichlorohydrin, sodium trimethaphosphate, phosphorous oxychloride, formaldehyde, glyoxal, acrolein, or N-methylol urea), and (3) a compound selected from the group of sulfur containing compounds consisting of 3-mercaptopropyltrimethoxysilane, 3-mercaptopropylmethyldimethoxysilane, starch xanthate Sulfamic acid adduct, dithiocarbonic acid, dithiocarbonic acid or xanthate combined with 3-mercaptopropyltrimethoxysilane or 3-mercaptopropylmethyldimethoxysilane, and trisodium salt of 1,3,5-Triazine-2,4,6-(1H,3H,5H)-trithione or selected from ground viscoses modified with NaOH-Diethylaminoethyl chloride hydrochloride and crosslinked with EPI(epichlorohydrine).

It is preferable that the regenerated cellulose ground viscose has an exchange capacity of 0.65–0.095 milliequivalents per gram.

The clays described in U.S. Pat. No. 6,261,459, incorporated herein by reference, may be selected for use in connection with this invention as based support. The based support provides improved physical and mechanical properties of the clay used that can be selected from the group consisting of ammonium bentonite organoclay, hectorite cationic clays such as Hectalite, siliceous high swelling Vulco clays (CS-50), non-blue bentonite, sodium bentonite clays, calcium bentonite clays, natural or synthetic zeolites, zeolite Analcime (Analcite), porous silicate glass, tricalcium aluminate, calcium silicate hydrate, crystalline metal-organic microporous materials, silica xerogels including high-porosity silica xerogels, and cross-linked montmorillonite molecular sieves.

Another useful base modified clay form uses Hectorite, Bentonite, or Hectorite-Bentonite clay mixtures modified with methyl-dihydrogenated tallow-amine, M2HT (CAS#61788-63-4), and with a quaternary ammonium compound. For example, quaternary ammonium clays $[N(+)R_{1,2,3,4}]$ $(Cl^{31})$ can be modified according to this invention with dihydrogenated-tallowamine, (2HT), in quarternized form or protonized form available from Maxichem Inc. as MS-0298E$_4$. These are useful bases to produce modified clay.

Also useful for the present invention is an organic complex based on the use of a mixture of high cation exchange hectorite clay (122 meq/g, or 18 parts by weight) with the high swelling sodium bentonite Vulco clay (CS-50, 35 parts by weight), reacted with at least one high alkyl group or ammonium chloride salt of methyl-dihydrogenated-tallowamine (M2HT), dihydrogenatedtallowamine (2HT), or tallow-1,3-propane diamine. Such products are available from Polymer Research Corporation as MS-0298F19E$_5$ or MS-0298WW.

These products above mentioned are all included by reference.

Commerical very highly charged hectorite clay (120 to 140 meq/g) and a high cation exchanged sodium bentonite (known as Black Hills Bentonite clays) are also useful as bases for modified organic clay in the present invention.

Products also useful in the present invention as adsorption/coagulant additives include diatomaceous earth products (in the following table and available from Polymer Reassert Corporation) in combination with activated carbon (AC) or in mod special (AC) by Calgon (F-400), elf ATOCHEM or ATO CECA (Acticarbone ENO or CX/H or CXV or other having very high surface area (over 1000 $m^2/g$); or lignin. The following gives the approximate chemical analyses in percent by weight for PR-110, PR-110A, PR-110B and PR-110C, which are described in Waldmann's '459 patent and are incorporated as reference:

|  | PR-110 | PR-110A | PR-110B | PR-110C |
|---|---|---|---|---|
| $SiO_2$ | 88–91% | 45.00% | 49.70% | 63.85% |
| $Al_2O_3$ | 3–4 | 6.56 | 1.80 | 10.07 |
| $Fe_2O_3$ | 1.1–1.5 | 1.67 | 0.51 | 2.83 |
| $P_2O_5$ | 0.1–0.2 | 0.00 | 0.00 | 0.00 |
| $TiO_2$ | 0.1–0.2 | 0.35 | 0.17 | 0.44 |
| CaO | 0.3–0.6 | 9.54 | 3.76 | 7.41 |
| MgO | 0.4–1.0 | 14.4 | 23.30 | 3.34 |
| $Na_2$ + K2O | 3.0–3.6 | 3.83 | 3.57 | 0.33 |
| $Fe_2O_3$ | 0.00 | 1.67 | 0.51 | 0.00 |
| FeO | 0.00 | 0.00 | 0.11 | 0.00 |
| LOI | to 100.0 | 18.65 | 16.20 | 7 |

VS high swelling sodium Vulco bentonite that contains over 90% Montmorillonite clay has a typical analysis of CS-50 as follows:

|  |  |
|---|---|
| $SiO_2$ | 53.02% |
| $Al_2O_3$ | 21.08 |
| $Fe_2O_3$ | 3.25 |
| FeO | 0.35 |
| MgO | 2.67 |
| Na and K | 257 as $Na_2O$ |
| CaO | 0.65 |
| Crystal water ($H_2O$) | 5.64 |
| Trace elements | 0.72 |

Alternatively, such clays can be described by the following formulae wherein the PR-110B is more refined than the PR-110A which is colloidal clay:

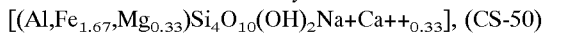[$(Al,Fe_{1.67},Mg_{0.33})Si_4O_{10}(OH)_2Na+Ca++_{0.33}$], (CS-50)

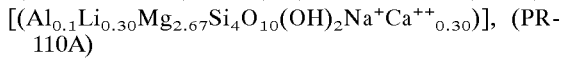[$(Al_{0.1}Li_{0.30}Mg_{2.67}Si_4O_{10}(OH)_2Na^+Ca^{++}_{0.30})$], (PR-110A)

[$(Al_{0.01}$" " " " " " ")], (PR-110B)

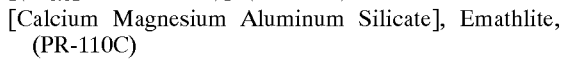[Calcium Magnesium Aluminum Silicate], Emathlite, (PR-110C)

The above clays are useful in combination with other products in formulations of the present invention to produce products in the powder, granule, or pellets form.

Examples of clays and adsorbent/absorbent products for use in the inventive compositions include of silica Vulco hectorite clays; sodium bentonite clays; calcium bentonite fuller's earth clays; aluminum siliceous clays; combinations of silica Vulco hectorite clays, sodium bentonite clays, calcium bentonite, fuller's earth clays, and aluminum siliceous clays; an organic modified sodium bentonite; an organic modified calcium bentonite; an organic modified mixture of both a sodium bentonite and a calcium bentonite; siliceous volclay; attapulgite clay; a hydrous silicate of aluminum generated from sodium bentonite; a hydrous silicate of aluminum generated from calcium bentonite; cross-linked montmorillonite molecular sieves; porous silicate glass; kaoline surface modified by polycyclopentadiene; tricalcium aluminate; calcium silicate hydrate (comprised of $Ca_6Si_6O_{17}(OH)_2$) with bulk density of 85–139 g/liter; silica xerogels; high-porosity silica xerogels; crystalline metal-organic microporous materials; surface altered zeolites; clinoptilolite, zeolite; Analcime; and Analcite (comprised of $Na_2O.Al_2O_3.4SiO_2.2H_2O$).

Useful materials known to be absorbent-adsorbent products include aluminum silicates, calcium aluminum silicates, magnesium silicates, calcium silicates, calcium magnesium silicates, siliceous volclay, attapulgite clay, a hydrous silicate of aluminum generated from sodium bentonite, a hydrous silicate of aluminum genenralted from calcium bentonite, cross-linked montmorillonite molecular sieves, porous silicate glass, kaolin surface modified by polycyclopentadiene, tricalcium aluminate, calcium silicate hydrate with bulk density of 85–139 g/liter, silica xerogels, high-porosity silica xerogels, crystalline metal-organic microporous materials, surface altered zeoliltes, clinoptilolite, zeolite Analcime, Analcite, and combinations of at least two compounds selected from the group consisting of aluminum silicates, calcium aluminum silicates, magnesium silicates, calcium silicates, and calcium magnesium silicates.

Examples of modified clays useful in preparing the present inventive compositions include clays modified with at least one component selected from the group consisting of mthyl-dihydrogenated tallow-amine (M2HT), dimethyl dihydrogenated tallow amine (2MHT), and other quaternary ammonium compounds having a moiety selected from the group consisting of chlorinr, methyl chloride, methyl dichloride, methyl sulfate and ethyl sulfate. The clays for these examples are preferably selected from the group consisting of Hectorite, Bentonite, Hectorite-Bentonite clay, and high swelling sodium bentonite Vulco clay.

Also useful are clay modified by a quarternary ammonium compound of the formula [N(+)$R_{1,2,3,4}$] (Cl'), clay protonized by organic acid, and clay modified with a compound selected from the group consisting of quarternized dihydrogenated-tallowamine (2HT), protonized 2HT, methyl chloride of high alkyl amine($C_{12}$–$C_{24}$), dimethyl chloride of high alkyl amine ($C_{12}$–$C_{24}$), methyl sulfate of high alkyl amine($C_{12}$–$C_{24}$), dimethyl sulfate of high alkyl amine ($C_{12}$–$C_{24}$), alkylaryl moiety quarternary ammonium ions, alkylated diazobicyclo ions, 1,4-diazobicyco[2,2,2.]octane, alkyl diammonium cations, decyltrimethyldiammonium (DTMA), and quaternary ammonium salts selected from the group consisting of dimethyldihydrogenatedtallow ammonium chloride (DMHT), methyl-dihydrogenatedoctadecylbenzylammonium chloride (DMHT-B). Among the preferred amines for such reactions are methyl dihydrogenated tallow ammonium chloride; dimethyl dihydrogenated tallow ammonium chloride; dimethyl dihydrogenated dicoco ammonium chloride; dimethyl ($C_{12}$–$C_{17}$) alkyl ammonium chlorides; N,N,N,N,N-pentamethyl-N-Tallowalkyl-trimethylene-dichlorides; benzyl ammoniumorgano clays; N-Alkyl-1, 3-propane fatty diamine; ether diamine; ($C_8$–$C_{23}$) tertiary amines; and dihydrogenated tallow amine.

Amine modification of clays can be accompanied by protonization of the clay. For example, high swelling sodium bentonite or calcium bentonite is amine modified with at least one component selected from the group of hydrophobic alkylamines, stearyl amine, primary hydrogenated tallow amine, di-hydrogenated tallow amine, and N-alkyl(tallow)-1,3-propane diamine. Then the amine modified clay is protonized by at least one acid selected from the group consisting of mono organic acid, diacid, $C_4$–$C_{18}$ acid, hydroxy acids, glacial acetic acid, hydroxy gylcolic acid, and di-glycolic acid.

In general, clays described herein can be reacted with at leasst one amine selected from protonized primary ($C_{12}$–$C_{22}$) alkyl amines, protonized secondary ($C_{14}$–$C_{28}$) alkyl amines, protonized secondary ($C_{14}$–$C_{28}$) alkyl diamine, protonized tertiary ($C_8$–$C_{30}$) alkyl amine, and quaternary ammonium compounds having at least one moiety selected from the group comprising chlorine, COO—, (OH)CH(CHO)COO—, —$SO_4$, —$SO_3$, —CH(OH)COOY, $CH_3$COO—, hydroxyalkyl (OH)COO—, —NCH(OH)(CHO), $Cl^{31}$, $Br^{31}$. Y can be any organic or inorganic moiety capable of binding to the carboxylic structure of the hydroxy acid.

The organic modified clays for use can also be mixed with cellulosic compounds. Examples of cellulosic compounds useful for such mixtures include modified cellulose fibers, hydrophobic brown cellulose, natural cellulose fiber, kenaf fiber, kenaf cellulose, high crosslinked starch xanthate, adipoguanamine surface modified cellulose, adipoguanamine silicone surface modified kenaf, polymethylene urea surface modified cellulose, polymethylene urea silicone surface modified cellulose, polymethylene urea surface modified kenaf, polymethylene urea silicone surface modified kenaf, and calcium sulfate hemihydrate cellulose derivitives. Modified cellulose fibers have a composition of about: cellulose (38%), lignin (18%), pectin (33%) and protein substances (11%). The source of these fibers can be kenaf.

A further embodiment of the present invention is based on the discovery of strong synergism in certain combinations, presented below, and useful for the destruction of high concentrations of nitrates or nitrate-heavy metals mixtures. Products of these mixtures may be in a powder form or as tablets. These products are described by the following chemical composition ranges:

| | |
|---|---|
| 1. Modified organic clay modified | 0 to 70 parts |
| 2. High swelling sodium bentonite | 0 to 70 parts |
| 3. Calcium bentonite | 0 to 65 parts |
| 4. Zeolite | 20 to 0 parts |
| 5. Insoluble carbohydrate polymer as high crosslinked yellow starch xanthate (PR-XIS 100) | 70 to 0 parts |
| 6. Insoluble carbohydrate polymer crosslinked Starch xanthate alloy with triazine-trithione (PR-XIS 210) | 0 to 70 parts |
| 7. Activated carbon, anthracite or lignin | 0 to 80 parts | providing that at least two of the components 1 to 7 are present. The inventive product is further illustrated by the following Examples:

EXAMPLE 1

A mixture of an organic clay modified MS-0298$E_4$ (sold by Maxichem, Inc.), high swelling sodium bentonite clay (CS-50) sold by American Colloids, calcium bentonite and insoluble highly crosslinked carbohydrate polymer containing carbon-sulfide or disulfide groups (PR-XIS 100 sold by Polymer Research Corporation as high crosslinked yellow starch xanthate powder) in a ratio of 1:1.2:1:7.00 were milled together in a ribbon blender or hammer mill to less than 50 microns. The product is available from Polymer Research Corporation under name MS-0298XMT/C in a powder form (tint greenish color and specific gravity of 1.10 g/ml ($H_2O=1$)), or in granule form. This mixture is designated as (Product A).

EXAMPLE 2

An organic modified clay sold under name of Bentone 34 (sold by Rehox, Inc.) is mixed and milled together in a hammer mill or ribbon blender with high swelling sodium bentonite (CS-50) and PR-XIS 100 in the ratio of 1:1:4.5. The product is available from Polymer Research Corporation under the name MS-0298XMT/A, and is designated as (Product B).

EXAMPLE 3

A modified organic clay MS-0298MDF19 (described in U.S. Pat. No. 6,261,459 and available from Polymer Research Corporation) is used as substitute for MS-0298$E_4$ of Example 1. This is mixed with calcium bentonite, MS-XIS 100 and triazine-trithione groups (PR-XIS 210 available from Maxichem, Inc. as highly crosslinked yellow starch xanthate powder copolymer) in the ratio of 1.14:1.14:1.00:7.01 and prepared following the procedure of Example 1. This product is available from Polymer Research Corporation under the name of MS-0298XMT/E, and is designated as (Product C).

EXAMPLE 4

A high swelling sodium bentonite (CS-50), natural zeolite and PR-XIS 100 are mixed in a ribbon blender in the ratio of 1:8.02:30.05 and then granulated. This product is available from Polymer Research Corporation under the name MS-0298XMT/CC, and is designated as (Product D).

EXAMPLE 5

Another embodiment of the present invention consists of mixing in a hammer mill MS-8920F19C (as described in '459 patent) with PR-XIS 100 (described in Example 1) in a ratio of 4.33:1.00 and granulated. This product is available from Polymer Research Corporation under the name MS-0298XMT/W designated as (Product E).

EXAMPLE 6

Another embodiment of the present invention consists of mixing one of the Products A to E with activated carbon (AC) known in the market as Calgon F-400, elf ATOCHEM (e.g. Acticarbone ENO or CX/H or CXV), or anthracite, or lignin in a weight ratio of (1–:0.5): (0.5–1.0) with respect of products ratio to (AC). These products are available from Polymer Research Corporation as powder—pelletized under the name MS-0298XMT/WAC and designate as (Product F).

These product compositions are also compatible with an anionic flocculent such as PR-8633 (available from Maxichem, Inc) and can be use in the powder form or granules known as MS-0298XMT/WACF. The product MS-0298XMT/WACF has very good properties as absorbent-adsorbent-coagulant-flocculent in one composition. These products are especially useful for treatment of wastewater streams with high metals concentration or nitrate-metal mixtures. This combination of properties for MS-0298XMT/WACF is leaves a metal-nitrate water stream actually free of nitrate, and heavy metal cations in aqua solution are polished to a level under the maximum limits required by EPA for discharged effluents (See Table 2, Nitrate & Metals Removal attached; Test performed by BDL Environmental Technologies).

The superior advantage of this invention is also that the nitrate water stream, or nitrate and havy metal cations present in wastewater, can be treated in batchwise or in flow systems (with canister(s) having layers with granules of products used) without pH adjustment, without electroposi-tive metals present, and without free inorganic acid.

A standard water treatment method is followed to test nitrate levels, before and after treatment, as described by HATCH/EPA Method No 1468-03. The treatment process of the present invention comprises the following steps:

1. Without pH adjustment in a 1000-ml beaker is added 70-PPM standard sodium nitrate to DOD site ground water with pH and products used as is stated in Table 1. A sample without added nitrate was also processed similarly using industrial effluent water.

The media was agitated for 1 hr.

The Test Results are summarized in Table 1–4. Table 1 shows a comparison of three of the novel compositions for Nitrate Removal disclosed herein. Table 2 gives results for both Nitrate & Metal Removal. Table 3 shows additional test results for Nitrate Removal. Table 4 gives Nitrogen removal Test Results for Hog arm Wastewater. All tests were done by BDL Environmental Technologies of Charleston S.C.

TABLE 1

Nitrate Removal Test Results

| Product | Constituent Level (mg/L) | Test #1 Residual Reduction (mg/L) | (%) | (pH) | Test #2 Residual Reduction (mg/L) | (%) | (pH) | Test #3 Residual Reduction (mg/L) | (%) | (pH) |
|---|---|---|---|---|---|---|---|---|---|---|
| MS-0298XMT/C | 10.0* | 0.0 | 100.0 | 7.4 | | | | | | |
| MS-0298XMT/C | 70.0** | | | | 0.0 | 100.0 | 8.4 | | | |
| MS-0298XMT/A | 70.0** | | | | | | | 0.0 | 100.0 | 8.4 |
| MS-0298XMT/CC | 70.0** | 0.0 | 100.0 | 7.4 | | | | | | |

*Ground water from lock manufacturing company
**Ground water from a DOD site with 0.8 grams (70 ppm) nitrate added.

TABLE 2

Nitrate & Metals Removal Test Results, pH of 8.4

| Product | Con- stituents | Constituent Initial Level (mg/L) | Constituent Residual (mg/L) | Reduction (%) |
|---|---|---|---|---|
| MS-0298XMT/CC | Nitrate | 70.0 | 0.0 | 100.0 |
| | Zn | 200.7 | 0.112 | 99.9 |
| | Cd | 213.2 | 0.002 | 99.9 |
| | Pb | 239.2 | <0.004 | 99.9 |

Note: pH level of the water was 8.4

TABLE 3

Nitrate Removal with MS-298XMT/C, Test Results

| Constituent | Constituent Level (mg/L) | Test Results Residual (mg/L) | Reduction (%) |
|---|---|---|---|
| 1-Nitrate* | 10.0 | 0.0 | 100.0 |
| 2-Nitrate** | 70.0 | 0.0 | 100.0 |
| 3-Nitrate** | 70.0 | 0.0 | 100.0 |
| 4-Nitrate** | 70.0 | 0.0 | 100.0 |

*Ground water from lock manufacturing company
**Ground water from a DOD site with 0.8 grams (70 ppm) nitrate added.

TABLE 4

Nitrogen Reduction in Hog Farm Wastewater Direct from Hoghouse

| Constituent | Initial Constituent Level (mg/L) | Test #1 Residual (mg/L) | Reduction (%) | Test #2 Residual (mg/L) | Reduction (%) | Test #3 Residual (mg/L) | Reduction (%) |
|---|---|---|---|---|---|---|---|
| Nitrogen | 25,160 | 1.087 | 95.7 | 879 | 97.1 | 819 | 97.4 |
| Medium Used | | MS-0298MDF19 | | MS-0298F19A | | MS-0298F19B | |

The novel compositions of the present invention may also contain cationic, anionic, and/or non-ionic polyelectrolyte flocculants. Anionic flocculants are preferred.

It is to be understood that the forms of the invention herewith described are to be taken as preferred examples of the same, and that various changes may be resorted to without departing from the spirit of the invention or the scope of the subjoined claims.

What is claimed is:

1. An improved composition for nitrate removal and for the treatment of waste water streams, without pH adjustment, comprising: (1) a first component selected from the group consisting of clay absorbents, absorbent-adsorbent products, and organic modified clays and (2) a second component selected from the group consisting of:

a. highly insoluble crosslinked carbohydrate polymers with a branched-chain structure containing a moiety selected from the group consisting of sulfides, disulfides, sulfonates, and sulfates;

b. crosslinked starch xanthates;

c. xanthates;

d. starch xanthate-xanthides;

e. a sulfur containing compound selected from the group consisting of 3-mercaptopropyltrimethoxysilane, 3-mercaptopropylmethyldimethoxysilane, starch xanthate Sulfamic acid adduct, dithiocarbonic acid, dithiocarbonic acid combined with 3-mercaptopropyltrimethoxysilane, dithiocarbonic acid combined with 3-mercaptopropylmethyldimethoxysilane, xanthate combined with 3-mercaptopropyltrimethoxysilane, xanthate combined with 3-mercaptopropylmethyldimethoxysilane, and trisodium salt of 1,3,5-Triazine-2,4,6-(1H,3H,5H)-trithione; and f. regenerated cellulose (Ground viscose);

wherein said composition is in a solid form selected from the group consisting of granules and pellets; and wherein said composition is used to treat waters without any need to adjust pH.

2. A composition according to claim 1 further containing a compound selected from the group consisting of activated carbon, anthracite, charcoal, and lignin.

3. A composition according to claim 1 comprising:
  (a) up to 70 parts, high swelling sodium bentonite;
  (b) from 10 to 70 parts, calcium bentonite;
  (c) up to 70 parts, zeolite; and
  (d) a component selected from the group consisting of:
    (1) up to 20 parts, insoluble carbohydrate polymer of highly crosslinked yellow starch xanthate (PR-XIS 100);
    (2) from 0.5 to 70 parts, of an insoluble carbohydrate polymer consisting of a crosslinked starch xanthate alloy with sulfamic acid; and
    (3) from 70 to 0.1 parts, 1,3,5 triazine-trithione salt PR-XIS 210.

4. A composition according to claim 1 further containing a polyelectrolyte flocculant selected from the group consisting of cationic polyelectrolytes, anionic polyelectrolytes, and nonionic polyelectrolytes.

5. A composition according to claim 3 further containing a compound selected from the group consisting of activated carbon, anthracite, charcoal, and lignin.

6. A composition according to claim 4 wherein said polyelectrolyte flocculant is selected from the group consisting of anionic polyelectrolytes.

7. An improved composition for nitrate removal and for the treatment of waste water streams, without pH adjustment, comprising at least one component selected from the group consisting of:
  (a) up to 70 parts, high swelling sodium bentonite;
  (b) up to 70 parts, calcium bentonite;
  (c) up to 70 parts, zeolite; and
  (d) up to 70 parts, organic modified clay; and
at least one component selected from the group consisting of:
  (e) up to 20 parts, insoluble carbohydrate polymer of highly crosslinked yellow starch xanthate (PR-XIS 100);
  (f) from 0.5 to 70 parts, insoluble carbohydrate polymer crosslinked starch xanthate alloy with sulfamic acid; and
  (g) from 70 to 0.1 parts, 1,3,5 triazine-trithione salt PR-XIS 210.

8. A composition according to claim 7 which further comprises at least one compound selected from the group consisting of activated carbon, anthracite, charcoal, and lignin.

* * * * *